Aug. 2, 1932.  H. RAABER ET AL  1,869,505

SOUND LOCATION DEVICE

Filed May 7, 1931

Inventors:
H. Raaber, I. Pechan
K. Petschenig &
E. Eichwalder by  E. F. Wenderoth
Atty Patented Aug. 2, 1932

1,869,505

UNITED STATES PATENT OFFICE

HANS RAABER, KARL PETSCHENIG, IGNAZ PECHAN, AND ERNST EICHWALDER, OF VIENNA, AUSTRIA, ASSIGNORS TO ACTIENGESELLSCHAFT C. P. GOERZ OPTISCHE ANSTALT ACTIOVA SPOLECNOST K. P. GOERZ OPTICKY USTAV, OF BRATISLAVA, CZECHOSLOVAKIA, A COMPANY OF CZECHOSLOVAKIA

SOUND LOCATION DEVICE

Application filed May 7, 1931, Serial No. 535,792, and in Germany May 17, 1930.

The directions for incoming sound rays determined by the apparatus usually employed for this purpose differ, as far as the angle of altitude is concerned, from the actual angle of altitude of the source of sound as determined by optical means, the said angle of altitude as determined by acoustical means being always smaller than the actual angles of altitude of the source of sound. The differences between the angles of altitude as determined by the two methods are the greater the smaller is the angle of altitude, and the greater is the vertical height of the source of sound above the horizon. The said differences are due to the fact, that the velocity of propagation of sound in the air depends to a notable extent of the temperature of the air while the influence of the air pressure on this velocity is comparatively very small. The velocities of the propagation of sound in air at different temperatures are in the ratio of the square roots of the absolute temperatures of the air, that is to say $$\frac{c_1}{c_2} = \sqrt{\frac{t_1+273}{t_2+273}}$$

the temperatures $t_1$ and $t_2$ being measured in centigrades. Now as horizontal strata of air may be assumed to be the strata of equal temperature, the temperature $t$ of each of the said horizontal strata may be determined from the temperature $t_0$ at the ground and the vertical height $h$ of the same above the ground and the temperature difference $\Sigma = 0.0047°$ C. per meter difference in height by the known formula $t = t_0 - \Sigma h$. Owing to the fact that the rays of sound pass obliquely from each of the said horizontal strata into those next below them having a higher temperature and a higher velocity of propagation of sound, the rays of sound become curved which in the case of horizontally incoming sound rays result in the greatest differences, between altitude angles determined acoustically and altitude angles determined optically of one and the same source of sound. In the case of vertically incoming sound rays there are no such differences owing to the fact that the rays of sound pass perpendicularly through the various strata of air and hence there is no refraction of the rays of sound.

The object of the present invention is to determine mechanically from the given or estimated height of the source of sound above the horizon and from the altitude angle of the incoming rays of sound the actual angle of altitude of the source of sound and to transmit this actual angle of altitude to other instruments such as telescopes, search lights, gun laying devices or the like.

With this object in view the present invention substantially consists in that the movements of rotation of the sound rays receiver around a horizontal axis are transmitted by a suitable gearing to the altitude angle indicator of the source of sound in such a manner that the angle between the altitude indicated by the said indicator and the axis of the acoustic sound receiver has its maximum value when the last named axis is horizontal, the said maximum value being adjustable in accordance with the vertical height of the source of sound above the horizon and with the temperature at the ground, the said angle decreasing at a predetermined rate as the altitude angle indicated by the said indicator and being reduced to zero when the incoming sound rays are vertical.

In the annexed drawing two embodiments of our present invention are shown by way of example.

Figure 1:
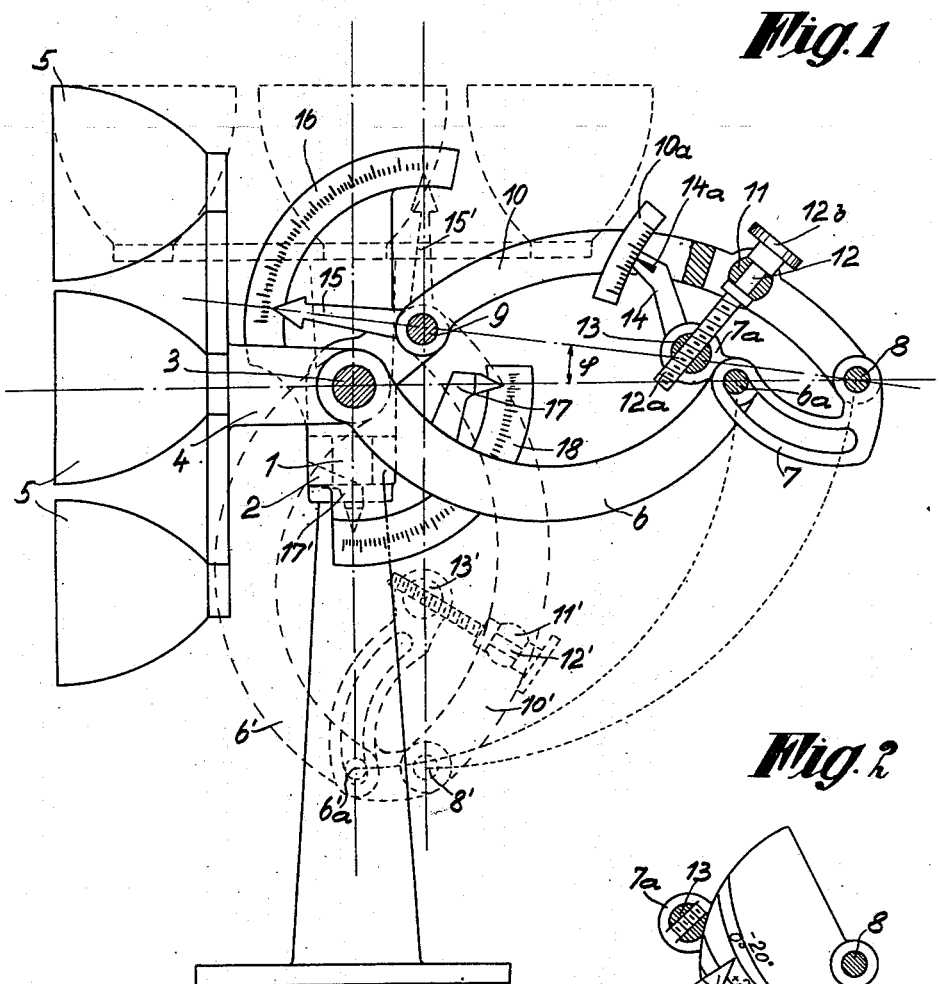
Fig. 1 is a side elevation of the first embodiment.

On a vertical shaft 1, Fig. 1, the bearing 2 for the horizontal shaft 3 of the sound receiver is rotatably mounted. On this horizontal shaft 3 is rotatably mounted the frame 4 of the sound receiver 5, 5 which in the position shown in full lines is adjusted for horizontally incoming sound rays. Fast on the said frame is the actuating lever 6 which carries a stud 6a engaging in the position of the parts shown in full lines into a suitable curved slot in an arm 7 rotatably mounted on a journal pin 8 carried by the bifurcated end of a link 10 rotatably mounted on a journal pin 9 which is secured to the bearing 2 and parallel to the shaft 3. In the bifurcated part of the link 10 a second bolt 11 is rotatably mounted and provided with a transverse bore which encloses the smooth neck 12 of a screw provided with the thread 12a and a knurled disc 12b which thus is prevented from moving axially relatively to the bolt 11. The screw thread 12a engages into a female thread cut into the transverse bore of a bolt 13 rotatably mounted in the bifurcated end 7a of the arm 7. To the bifurcated end 7a is secured a pointer arm 14, the pointer mark 14a of which moves along an exchangeable scale secured to the link 10 and concentric to the journal pin 8. By turning the knurled disc 12b the pointer mark 14a may be adjusted in accordance with the vertical height of the sound source above the horizon and with the temperature at the ground.

Owing to the downwardly convex curvature of the sound rays in the position for horizontally incoming rays of sound shown in full lines the source of sound is actually at an angle of altitude $\varphi$ above the horizon and in the direction of the line connecting the centres of journal pins 8 and 9 as is indicated by the position of the pointer 15 secured to the link 10 on the scale 16 secured to the bearing 2. The position of the arm 7 and the curvature of the slot therein are empirically determined in such a manner that the angle $\varphi$ of altitude of the source of sound located at a given or estimated height above the horizon, which angle $\varphi$ is indicated by the pointer 15 on the scale 16 concentric to the journal pin 9, differs from the angle of incoming sound rays indicated by the pointer 17 secured to the actuating lever 6 on the scale 18 concentric to the shaft 3 and secured to the bearing 2 by the amount found by computing from the formulæ above given. Therefore in the case of vertically incoming sound rays which, owing to the fact that they pass through the horizontal strata of air perpendicularly thereto, and hence do not undergo any change of direction by refraction, the said difference must be reduced to zero as is seen in Fig. 1, which shows the corresponding position of the parts of the apparatus in dotted lines. In this position of the parts the centre of the journal pin 8 is at $8^1$ and the centre of the stud 6a is at $6a^1$. As the connecting line of the centres of the shaft 3 and stud 6a gives the direction of the incoming rays of sound and the connecting line of the centres of the journal pins 8 and 9, and in the position shown in dotted lines of the journal pins $8^1$ and 9, gives the direction to the actual position of the source of sound, therefore from the vertical position of the directions 3, $6a^1$ and 9, $8^1$ follows the angle of altitude of 90° of the actual position of the source of sound.

Figure 2:
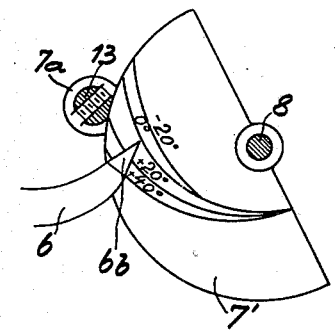
Fig. 2 is a detail illustrating the second embodiment.

Instead of the rotatably and adjustably mounted slotted arm 7 also a table of curves $7^1$ connected to the link 10 might be used as shown in Fig. 2, on which curve table curves are drawn which are computed for different temperatures at the ground and for different heights of the source of sound above the horizon. A pointer 6b on the actuating lever 6 is then substituted for the stud 6a. When using the apparatus an attendant permanently adjusts the pointer 6b by operating the journal pin 8 provided with a handle on that curve of the curve table $7^1$ which corresponds to the temperature at the ground after the curve table has been adjusted in accordance with the estimated height of the source of sound.

What we claim is:

1. A device for determining the direction of sound rays incoming from an overground sound rays emitting source comprising sound receivers, a frame carrying the said sound receivers, a horizontal shaft on which the said frame is rotatably mounted, a pointer for indicating the actual angle of altitude of the said sound rays emitting source, means for adjusting the inclination of the said pointer to the horizontal in accordance with the height of the said sound rays emitting source above the horizon and with the temperature at the ground for the horizontal position of the acoustic axes of the said sound receivers and means for operatively connecting the said frame with the said pointer, whereby the difference between the angle indicated by the said pointer and the angle of inclination of the acoustic axes of the said sound receiver to the horizon is decreased following a predetermined law as the angle of inclination of the acoustic axes to the said sound receivers to the horizon increases from 0° to 90° and becomes zero when the last named angle becomes 90°.

2. A device for determining the direction of sound rays incoming from an overground sound rays emitting source comprising sound receivers, a frame carrying the said sound receivers, a horizontal shaft on which the said frame is rotatably mounted, a pointer for indicating the actual angle of altitude of the said sound rays emitting source, means for operatively connecting the said frame with the said pointer, these last named means comprising an actuating lever rigidly connected at one end to the said frame, a link pivoted in the stationary structure of the apparatus and carrying at its pivoted end the said pointer, an arm provided with a curved slot pivoted to the outer end of the said link, means for adjusting the said arm in accordance with the height of the sound rays emitting source above the horizon and the temperature at the ground, and a stud on the outer end of the said actuating link engaging into the curved slot in the said arm, whereby the difference between the angle indicated by the said pointer and the angle of inclination of the acoustic axes of the said sound receiver to the horizon is decreased, following a predetermined law, as the angle of inclination of the acoustic axes to the said sound receivers to the horizon increases from 0° to 90° and becomes zero when the last named angle becomes 90°.

3. A device for determining the direction of sound rays incoming from an overground sound rays emitting source comprising sound receivers, a frame carrying the said sound receivers, a horizontal shaft on which the said frame is rotatably mounted, a pointer for indicating the actual angle of altitude of the said sound rays emitting source, means for operatively connecting the said frame with the said pointer, these last named means comprising an actuating lever rigidly connected at one end to the said frame, a link pivoted in the stationary structure of the apparatus and carrying at its pivoted end the said pointer and a plate carried by the said link the other end of the said actuating lever being adapted to move along any of the said curves whereby the difference between the angle indicated by the said pointer and the angle of inclination of the acoustic axes of the said sound receiver to the horizon is decreased following a predetermined law, as the angle of inclination of the acoustic axes to the said sound receivers to the horizon increases from 0° to 90° and becomes zero when the last named angle becomes 90°.

In testimony whereof we affix our signatures.

HANS RAABER.
KARL PETSCHENIG.
IGNAZ PECHAN.
ERNST EICHWALDER.